United States Patent
Matheny et al.

(10) Patent No.: US 7,399,159 B2
(45) Date of Patent: Jul. 15, 2008

(54) DETACHABLE LEADING EDGE FOR AIRFOILS

(75) Inventors: Paul Matheny, Jupiter, FL (US); Brad Carter, Jupiter, FL (US); Brian Potter, Palm Beach Gardens, FL (US)

(73) Assignee: Florida Turbine Technologies, Inc, Jupiter, FL (US)

( * ) Notice: Subject to any disclaimer, the term of this patent is extended or adjusted under 35 U.S.C. 154(b) by 0 days.

(21) Appl. No.: 10/876,081

(22) Filed: Jun. 24, 2004

(65) Prior Publication Data
US 2005/0118028 A1   Jun. 2, 2005

Related U.S. Application Data

(60) Provisional application No. 60/482,559, filed on Jun. 25, 2003.

(51) Int. Cl.
F01D 5/28 (2006.01)
(52) U.S. Cl. ............... 416/62; 416/219 R; 416/220 R; 416/229 A; 416/234

(58) Field of Classification Search ......... 416/62, 416/175, 203, 183, 224, 234, 219 R, 220 R, 416/229 R, 229 A, 230, 221
See application file for complete search history.

(56) References Cited

U.S. PATENT DOCUMENTS

| | | | | |
|---|---|---|---|---|
| 3,424,433 | A | * | 1/1969 | Langshur ............... 416/237 |
| 4,125,344 | A | * | 11/1978 | Tiefenbacher ............ 416/183 |
| 4,326,833 | A | * | 4/1982 | Zelahy et al. ............ 416/224 |
| 5,725,354 | A | * | 3/1998 | Wadia et al. ............ 416/224 |
| 5,785,498 | A | * | 7/1998 | Quinn et al. ............ 416/224 |
| 6,318,964 | B1 | * | 11/2001 | Yang ................... 416/185 |
| 6,454,535 | B1 | * | 9/2002 | Goshorn et al. ......... 416/234 |
| 6,572,336 | B2 | * | 6/2003 | Horng et al. ........... 416/183 |
| 6,905,312 | B2 | * | 6/2005 | Bourgy et al. .......... 416/234 |

FOREIGN PATENT DOCUMENTS

| | | | | |
|---|---|---|---|---|
| FR | 1355380 | A * | 2/1964 | ............ 416/183 |
| GB | 680040 | A * | 10/1952 | ............ 416/183 |

* cited by examiner

*Primary Examiner*—Christopher Verdier
(74) *Attorney, Agent, or Firm*—Norman Friedland

(57) ABSTRACT

The airfoil of fan/compressor and turbine rotors is constructed to include a leading edge that is detachable. The leading edge includes an airfoil section and an attachment that is adapted to fit into a complementary groove formed in the rotor disk. The detachable leading edge is efficacious in integrated bladed rotor (IBR or BLISK) designs because damage to the leading edge can be fixed by either removing the leading edge and repairing it or replacing it without having to disturb the remaining portion of the IBR.

13 Claims, 2 Drawing Sheets

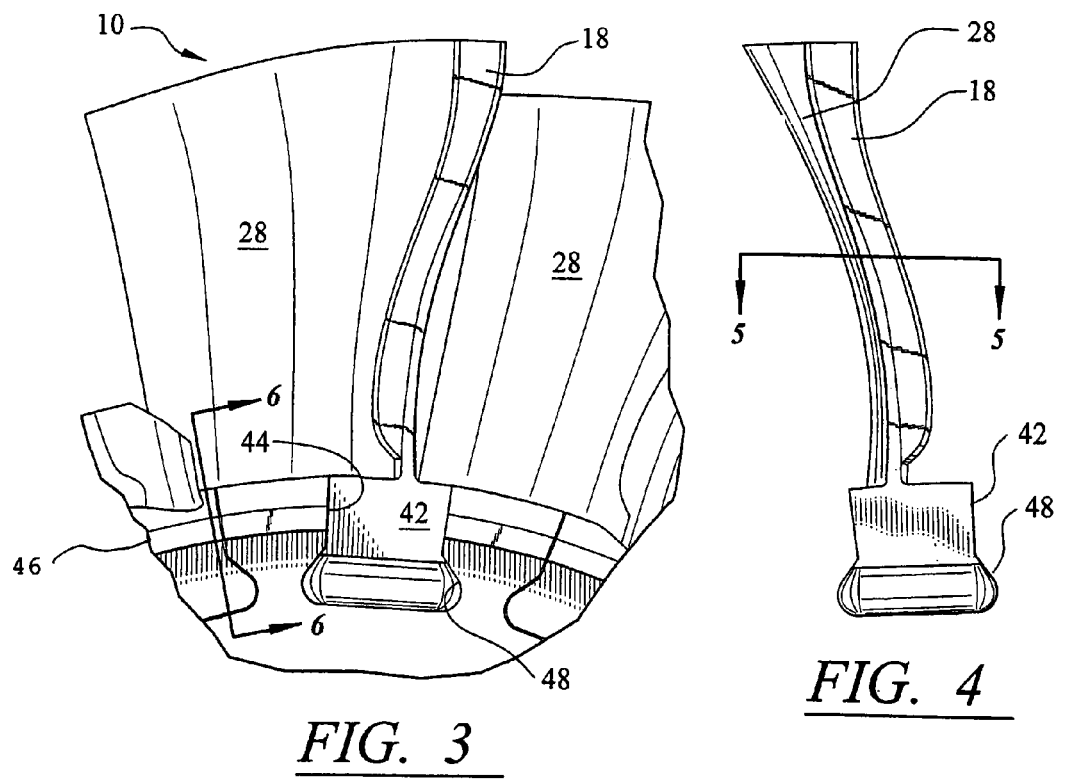
FIG. 3
FIG. 4
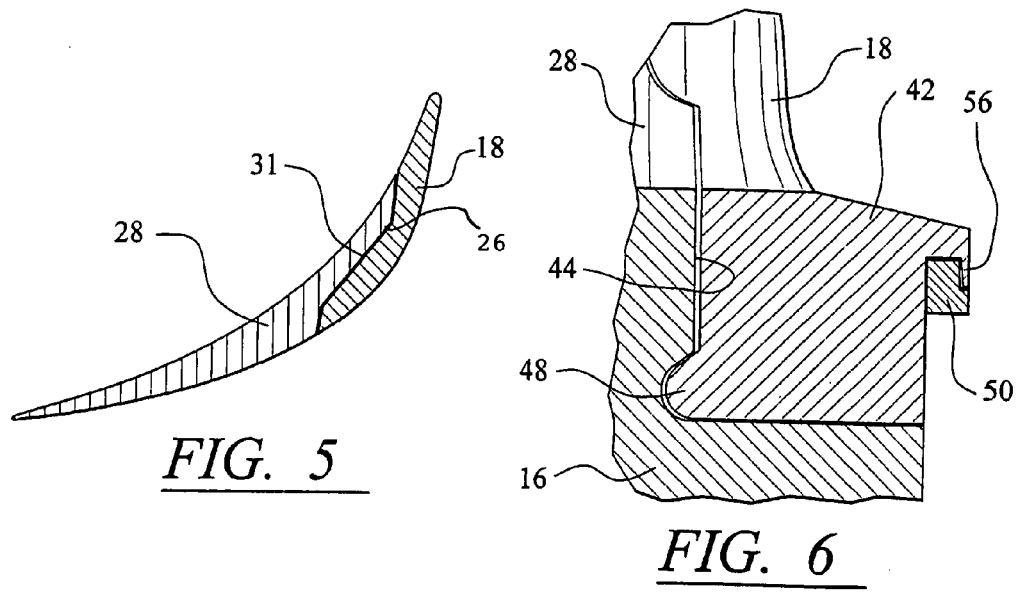
FIG. 5
FIG. 6

DETACHABLE LEADING EDGE FOR AIRFOILS

This application claims benefit of a prior filed co-pending U.S. provisional application Ser. No. 60/482,559, filed on Jun. 25, 2003 entitled "HYBRID DESIGN/DETACHABLE LEADING EDGE FOR FAN IBR AIRFOILS".

FEDERALLY SPONSORED RESEARCH

None

TECHNICAL FIELD

This invention relates to gas turbine engines of the fan/jet or jet type incorporating fan/compressor rotors and turbine rotors and more particularly to the airfoils of the fan/compressor and turbines as well as those utilized in integrated bladed rotor (IBR or BLISK) designs and to the construction thereof.

BACKGROUND OF THE INVENTION

As one skilled in this technology appreciates, the gas turbine power plant typically incorporates fans and compressor blades for imparting compression to the intake air (straight jet engines do not incorporate fans) which is then delivered to the combustor where fuel is combusted to add heat thereto. Hence, this engine working medium is accelerated before being delivered to the turbine which is mechanically connected to the fan/compressor so that the energy extracted from the engine working medium is converted to power the compressor fan/blades to pressurize the intake air and develop propulsive thrust. The fan blade, which essentially is a compressor blade that is typically mounted upstream of the smaller compressor blades, not only serves to pressurize the intake air, it also develops thrust which is added to the overall thrust developed by the engine.

As will become apparent from the description to follow, this invention is particularly efficacious for use in an IBR of a gas turbine engine, but also has potential use for airfoils that are utilized in a non IBR configuration. The following discussion relates to the IBR configuration.

Modern day fan blades are generally highly sophisticated so as to achieve high pressure ratios across the stage(s) of fan blades which require swept airfoils and contoured blade shaping to attain the necessary superior aerodynamics. The backward sweep of the airfoil leading edge typically serves to reduce shock losses and noise generation while the forward sweep is typically incorporated to enhance the aerodynamics of the airfoil.

In addition to the aerodynamics of the airfoil, be it a fan, compressor or turbine blade, a concern to the designer and engine user is the stress concentration of the blade. During operation the blades and disk rotate and generate substantial centrifugal forces which are carried by the disk. The designer of the IBR must assure that the steady tensile stress and the alternating stress are maintained within their limits throughout the entire IBR configuration for the entire operating envelope of the power plant. What is not in the control of the designer is localized stress concentration that is occasioned by blade damage due to foreign object ingestion. Ingested objects, such as grit or sand from the runways, small birds, ice, etc. during normal operation may cause chips or nicks in the blades and most commonly in the leading edge. Obviously, because the IBR is a complicated hardware requiring special materials and expensive manufacturing, it is extremely costly to discard an IBR whenever the blade becomes damaged. Since the IBR is an integral unit of the blades and disks, obviously the removal of the blade for repair purposes is non-existing.

While the teachings disclosed in U.S. Pat. No. 5,725,354 granted to Wadia, et al on Mar. 10, 1998 entitled *FORWARD SWEPT FAN BLADE*, relates to a separate leading edge, the present invention differs not only in the construction thereof, but also the design philosophy. To best understand the difference between these two concepts, one should appreciate the teachings in the Wadia et al reference, supra, where the swept portion of a IBR fan blade is made from a separate composite piece that fits into the portion of the airfoil of the fan blade so as to attain the forward sweep. As is true in all fan blades, the centrifugal loads generated by the disk create predominantly radial centrifugal forces in the blades which causes a steady tensile stress. In addition, the airflow over the blades induces vibration in the airfoil and creates alternating stresses. These stresses, i.e., steady tensile stress and alternating stresses are not uniform and vary over the length, width and thickness of the blade. This situation is exacerbated by indications on the airfoil such as nicks, chips, cracks and the like caused by sand, dirt, bird ingestion, etc. that causes stress concentration. The problem is more complicated when the leading edge is significantly swept forward. While this innovation provides aerodynamic benefits, it changes the center of gravity of the blade and hence, complicates the stress design of the airfoil. Hence, the purpose of the teachings of the '354 patent, supra, is to provide a design configuration that improves the stress problem by reducing the steady stress along the leading edge of the airfoil which would otherwise occur from effecting forward sweep.

Of significance, the present invention differs from the '354 patent and other heretofore known prior art designs, by 1) providing a removable leading edge that can be fabricated from the same or different materials and 2) designing the leading edge as an independent load carrying member where it includes an airfoil portion and an attachment portion (root), such that the loads on the airfoil are transmitted from the airfoil through the root of the leading edge into the disk. Hence, the disk, whether an IBR or a non-IBR fan must be designed to accommodate the root of the leading edge for attachment thereto.

SUMMARY OF THE INVENTION

An object of this invention is to provide for the airfoil of a compressor or fan or turbine for a gas turbine engine of the IBR type an improved detachable leading edge.

A feature of this invention is an improved leading edge that is removable from the IBR and includes an attachment base that is secured to the disk of the IBR.

Another feature of this invention is the improved detachable IBR leading edge that serves to ground the stresses impacted thereon by the air and engine working medium loadings and the centrifugal loadings through the disk supporting the detachable leading edge. The load that is seen by the leading edge transmits that load through the leading edge itself and into the disk by way of the leading edge attachment.

A feature of this invention is to provide a detachable leading edge for an airfoil whether it be an IBR or non-IBR configuration, so that the leading edge can be repaired or replaced and eliminating the requirement of repairing and/or replacing the entire IBR and is characterized as being relatively simple and economical to fabricate and being removable with sufficient ease.

The foregoing and other features of the present invention will become more apparent from the following description and accompanying drawings.

BRIEF DESCRIPTION OF THE DRAWINGS

FIG. 3 is an enlarged fragmentary view in perspective illustrating the details of the leading edge of FIG. 1;

FIG. 4 is a view in elevation of the leading edge;

FIG. 5 is a view of a section of the airfoil of the blade of the rotor taken along section lines 5-5; and FIG. 6 is a partial view in section taken along the sectional lines 6-6 of FIG. 3.

These figures merely serve to further clarify and illustrate the present invention and are not intended to limit the scope thereof.

DETAILED DESCRIPTION OF THE INVENTION

While the invention in its preferred embodiment describes the fan rotor fabricated in an IBR of a gas turbine engine, as one skilled in this art will appreciate that this invention is applicable to compressor rotors and turbine rotors and is efficacious where the leading edge is detachable from an IBR. It will also be understood that this invention is also applicable to turbines and to IBR and non-IBR configurations.

Figure 1:
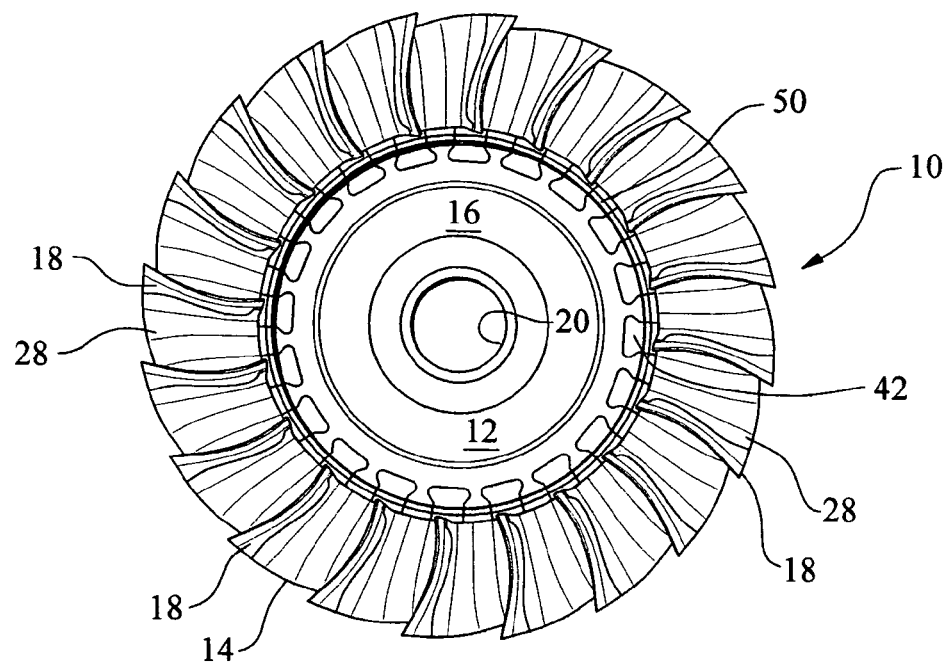
FIG. 1 is a view in elevation illustrating a rotor of the IBR type utilizing the detachable leading edge of this invention.
Figure 2:
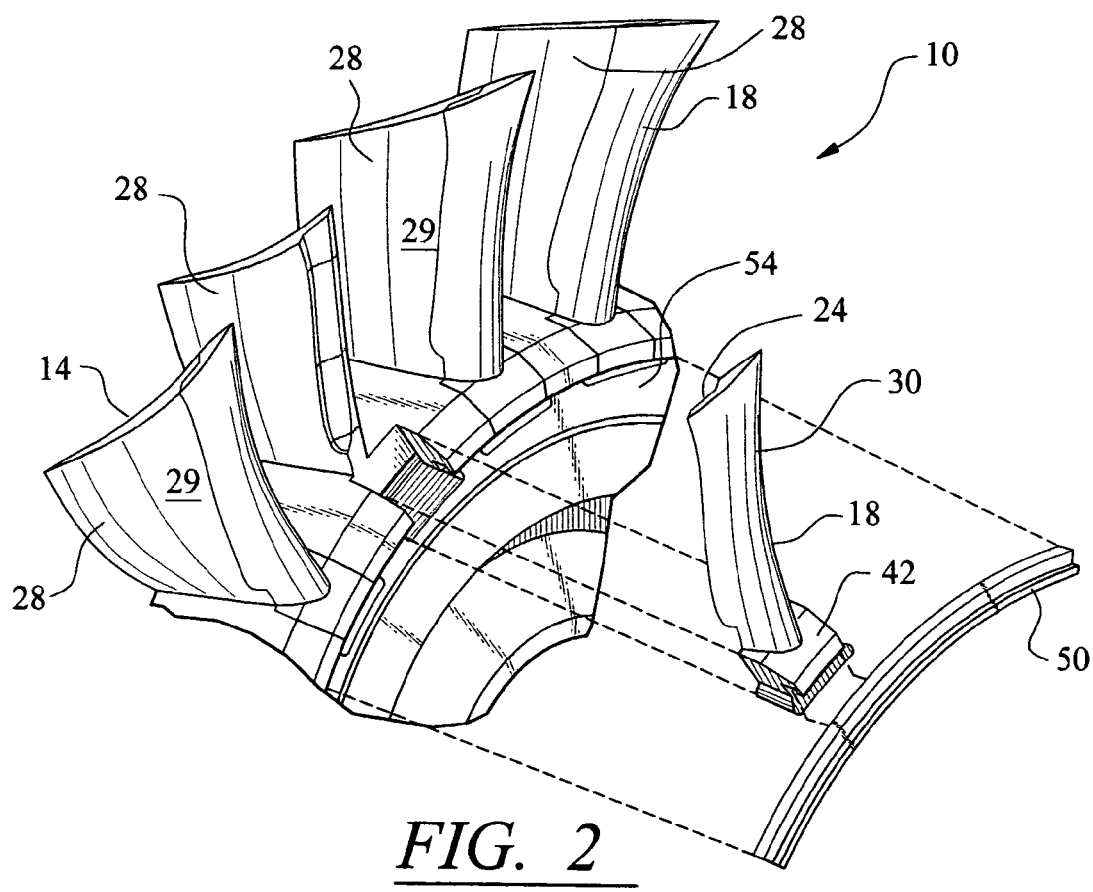
FIG. 2 is a fragmentary exploded view illustrating the leading edge of this invention.

The invention is best understood by referring to all of the FIGS. where the complete rotor is generally illustrated in FIG. 1 by reference numeral 10 comprising the IBR 12 having a blade 14 having a pressure side and a suction side integrally formed with the disk 16 and the detachable leading edge 18. The disk 16 can be made from any suitable material that is consistent with the requirements required for suitable operation in a gas turbine engine, as for example a metal alloy such as Inco 718, Waspaloy, titanium and the like or a ceramic or a composite material. The central opening 20 serves to receive the engine shaft (not shown) As best seen in FIG. 5, the leading edge 18 is mounted in a lap type fit 31 so that the aft edge or lip 24 is contoured to define a suitable indentation to fit with the complementary contoured fore edge or lip 26 of the main body 28 of the blade 14. A suitable tongue and groove fit or dove-tail configuration could be equally employed. It will be appreciated from the foregoing that the connection of the leading edge 18 to the main body 28 of the airfoil 29 forms a straight or constant arc interface extending from the root to the tip of the airfoil. The components can be either bonded by a suitable adhesive, particularly where a composite material is utilized as the leading edge, or can be fastened with suitable mechanical fasteners such as "winglets" mounted on the pressure side and the like. A bond from an elastomeric adhesive material such as Soundcoat DYAD 606 or 609 or ISD 113 (available from 3M) not only serve as a bonding material but also act as a damper that reduces vibrations and eliminates flutter.

Of importance in this invention, is that the mounting must assure that there is a smooth load transition between the leading edge and the blade main structure. It will also be appreciated that the load that the leading edge 18 sees will be transmitted from the main body 30 of the leading edge through the main body 30 to the root attachment 42, where it is then transmitted through the disk. The attachment 42 is mounted in slot 44 formed in the lip 46 of the disk 16. As best seen in FIG. 3, the slot 44 is configured similar to a dove-tail to complement the enlarged base portion 48 of the attachment 42 which serves to take up the centrifugal loads on the blade when it is in operation. A suitable retaining ring 50 mounted in an annular groove 56 formed on the face 54 of disk 16 serves to lock all of the leading edges of the respective circumferentially spaced blades comprising the rotor assembly to the disk independently of the structure that supports the the main body 38 of the blade 14.

In accordance with this invention the leading edge 18 is not only detachable from the main body 28 of the airfoil 29 so that it can be made from material that is different from the main body 28, it also can be removed when a replacement or repair is necessary. As will be appreciated, the blades, particularly fan blades are susceptible of erosion, corrosion, or damage from foreign objects or even pieces of the engine that may become dislodged. Whatever the reason, the damage must be rectified so that the engine can remain flight worthy. In either a IBR configured rotor or a non-IBR configured rotor, the removal of only the leading edge for repair or replacement is desirable. To more fully appreciate this aspect of the invention consider the IBR configuration. For example, the F-22 military airplane engines utilize IBRs that contain hollow titanium airfoils that are linear friction welded onto the disk. The current repair process for that IBR requires the removal of the damaged airfoil by a simple cutting operation and welding a new blade in its place. Once the new blade is inserted into the disk, the IBR needs to be reworked to smooth the surfaces and the blade-to-disk transition. Under these circumstances, each blade of the IBR can be replaced but one time as it would otherwise materially affect the structural integrity of the blade and attachment region of the disk.

As is also apparent from the foregoing, the ability to utilize different materials for the leading edge and particularly composite materials, the designer can design the blade to include swept back or swept forward contours to the blade to enhance the aerodynamics and efficiency of the blade.

As noted from all of the Figures the fore edge 26 of the blade 14 is contiguous with an edge of the detachable leadine edge 18 extending along the longitudinal expanse of the airfoil 29 of the detachable leading edge 18 and defines a smooth transition with the airfoil of the detachable leading edge and the airfoil of the respective blade 14. The aft edge portion is contiguous with the longitudinal edge of each of the blades and defines a continuous arc. The indented portion 24 extends from the root to the tip on the edge opposite to the trailing edge. The complementary indented portion extends from the root portion to the tip portion defining a smooth transition connection.

By virtue of this invention the blade designed with a detachable leading edge affords the following advantage amongst others:

1. The leading edge may be made from a material that is different than the material of the main body of the blade and hence, reduce the overall weight of the blade.

2. Because the material selected for the leading edge can be one that is susceptible of providing sweep to the blade, the overall efficiency and aerodynamics of the blade can be improved.

3. The leading edge being mounted directly into the disk lends itself to being utilized in both IBRs and non-IBRs.

4. Because of the smooth transition of the leading edge from the root to the tip of the airfoil along the contoured edge of the main blade portion and the independent attachment to the disk, the loads generated by thermal and centrifugal loadings on the leading edge is transmitted directly through the leading edge to the disk 5. The removal aspect of the leading edge results in ease of repair, less costly repairs and the ability to remove the leading edge without having to remove the disk which is a maintenance asset.

6. The attachment of the leading edge can be used to provide damping to the IBR through the adhesive or damping bond to reduce vibrations and eliminate flutter.

Although this invention has been shown and described with respect to detailed embodiments thereof, it will be appreciated and understood by those skilled in the art that various changes in form and detail thereof may be made without departing from the spirit and scope of the claimed invention.

The invention claimed is:

1. A detachable leading edge having an airfoil utilized in a rotor fo, said rotor having a plurality of blades and a disk, said disk supporting said blades and a detachable leading edge mounted on each of said plurality of blades, one blade of said plurality of blades including an airfoil extending from said disk and having a trailing edge, an airfoil on one of said detachable leading edges aligned with said airfoil of said one blade, an attachment on one end of said detachable leading edge, said attachment adapted to be mounted in a complementary slot formed in said disk wherein the loads on said airfoil of said leading edge are transmitted to said disk through said airfoil on said detachable leading edge and said attachment and said detachable leading edge is removable from said one blade independent of the plurality of detachable leading edges.

2. A detachable leading edge as claimed in claim 1 wherein, said detachable leading edge having an edge extending longitudinally, said disk and said plurality of blades are an integrated bladed disk, said one blade having a fore edge extending longitudinally disposed opposite said trailing edge that is contiguous with said edge of said detachable leading edge extending along the longitudinal expanse of said airfoil of said detachable leading edge and defining a smooth transition with the airfoil of said detachable leading edge and the airfoil of the respective blade.

3. A detachable leading edge as claimed in claim 2 wherein said detachable leading edge being made from a material that is different than the material of said integrated bladed disk.

4. A detachable leading edge as claimed in claim 3 wherein said material for said detachable leading edge is made from a composite.

5. A rotor, said rotor comprising a disk, a plurality of circumferentially spaced blades affixed to said disk and adapted for rotary motion, each of said blades including a trailing edge, the improvement comprising a detachable leading edge for each of said blades, said detachable leading edge having an airfoil portion, a tip portion, a root portion and an attachment portion, said airfoil portion having an aft edge portion extending from said tip portion to said root portion and being contiguous with the longitudinal edge of each of said blades that is opposite said trailing edge, said attachment portion being mounted in a slot formed in said disk whereby each of said detachable leading edges is removable independently of each of said other detachable leading edges and the load on said detachable leading edges being transmitted through said airfoil of said detachable leading edges to said disk through said attachment portion.

6. A rotor as claimed in claim 5 wherein said aft edge portion of each respective detachable leading edge is bonded to a respective longitudinal edge of each of a respective blade.

7. A rotor as claimed in claim 6 wherein said each of said blades includes an indented portion extending from said root to said tip on the edge opposite said trailing edge and said airfoil of said detachable leading edge having a complementary indented portion extending from said root portion to said tip portion defining a smooth transition connection.

8. A rotor as claimed in claim 7 wherein said detachable leading edge being made from a material that is different than the material of each of said blades.

9. A rotor as claimed in claim 8 wherein said material for said leading edge is made from a composite.

10. An integrated bladed rotor having a disk portion and a plurality of circumferentially spaced blades extending from said disk portion for rotary motion, each of said blades having a trailing edge and a fore end edge extending longitudinally, the improvement comprising a detachable leading edge having an airfoil portion for each of said blades, said detachable leading edge having a tip portion, a root portion and an attachment portion, each respective detachable leading edge having an aft edge portion extending from said tip portion to said root portion and being contiguous with a respective longitudinal edge of each respective blade and defining a continuous arc interface, said attachment portion being mounted in a slot formed in said disk portion whereby said detachable leading edge is removable from said integrated bladed rotor independently of each of said blades and the load on said detachable leading edge being transmitted through said airfoil of said leading edge to said disk portion through said attachment portion, said aft end portion of each said respective detachable leading edge is bonded to each respective blade at said interface, said interface of each of said blades includes an indented portion extending from said root to said tip on the edge opposite said trailing edge and said airfoil of said detachable leading edge having a complementary indented portion extending from said root portion to said tip portion defining a lap fit and a smooth transition connection.

11. An integrated bladed rotor as claimed in claim 10 wherein said detachable leading edge being made from a material that is different than the material of the integrated bladed rotor.

12. An integrated bladed rotor as claimed in claim 11 wherein said material for said leading edge is made from a composite.

13. An integrated bladed rotor as claimed in claim 12 including a ring mounted on said disk and supported thereby for locking said detachable leading edge of each of said blades in place.

* * * * *